United States Patent [19]

Lissel et al.

[11] Patent Number: 5,946,273
[45] Date of Patent: Aug. 31, 1999

[54] ARRANGEMENT FOR DETERMINING THE DISTANCE OF OBJECTS

[75] Inventors: Ernst Lissel, Wolfsburg; Ulrich Bahr, Braunschweig, both of Germany

[73] Assignee: Volkswagen AG, Wolfsburg dex

[21] Appl. No.: 08/916,148

[22] Filed: Aug. 21, 1997

[30] Foreign Application Priority Data

Aug. 21, 1996 [DE] Germany .................. 196 33 556

[51] Int. Cl.⁶ .................................................. H04R 19/00
[52] U.S. Cl. ............................................ 367/181; 381/191
[58] Field of Search ................... 367/170, 181; 381/191

[56] References Cited

U.S. PATENT DOCUMENTS

| | | | |
|---|---|---|---|
| 3,736,436 | 5/1973 | Crites | 381/191 |
| 3,736,552 | 5/1973 | Sessler et al. | 381/191 |
| 3,942,029 | 3/1976 | Kawakami et al. | 381/191 |
| 4,081,626 | 3/1978 | Muggli et al. | 381/191 |
| 4,437,032 | 3/1984 | Gelhard | 310/324 |
| 4,710,020 | 12/1987 | Maddox et al. | 180/167 |
| 4,887,248 | 12/1989 | Griebeler | 367/181 |
| 5,572,484 | 11/1996 | Gaus et al. | 367/99 |
| 5,619,476 | 4/1997 | Haller et al. | 367/181 |
| 5,629,690 | 5/1997 | Knoll | 340/904 |

FOREIGN PATENT DOCUMENTS 4201806  9/1992  Germany .

*Primary Examiner*—Ian J. Lobo
*Attorney, Agent, or Firm*—Baker & Botts, L.L.P.

[57] ABSTRACT

An arrangement for determining the distance of objects has a number of electrostatic ultrasonic transducers which are formed from superposed layers. Fixed electrodes for the transducers and conductive tracks connected to them are formed in a first structured metal layer. The other layers are an insulation layer and a full-surface second metal layer on the insulation layer which provides counterelectrodes for the electrodes provided by the first metal layer.

13 Claims, 3 Drawing Sheets

ARRANGEMENT FOR DETERMINING THE DISTANCE OF OBJECTS

BACKGROUND OF THE INVENTION

This invention relates to arrangements for determining the distance of objects using ultrasonic transducers, to a method for producing such transducer arrangements and to distance-determining arrangements in a motor vehicle.

U.S. Pat. No. 4,437,032 discloses a sensor for performing distance measurements using ultrasonic echo principles in order to detect and display the approximate distances between a motor vehicle and obstacles in the vicinity of the vehicle. The sensor includes an ultrasonic transmission and reception transducer for transmitting ultrasonic signals and receiving ultrasonic signals reflected by the obstacles. The transducer consists of an insulating material and piezoceramic oscillators.

German Offenlegungsschrift No. 42 01 806 discloses a reversing aid for automobiles which uses ultrasonic waves to measure the distance between a vehicle and an obstacle behind it. The ultrasonic emitters which emit ultrasonic pulse and the electroacoustic transducers which receive the ultrasonic waves reflected by the obstacles are inlaid in flexible plastic plates. These plates are positioned on the left and right rear fenders of the vehicle. Piezoelectric, magnetostrictive or other ultrasonic emitters can be employed.

U.S. Pat. No. 5,629,690 discloses ultrasonic sensors mounted in corresponding bores in motor vehicle fenders, the bores being oriented in such a way that reflections from the road do not produce interference. Each ultrasonic sensor is provided with a cover such as a strong plastic sheet which is matched to the contour of the outer part of the motor vehicle and may also cover the entire part of the vehicle in which the sensor is mounted.

The prior art arrangements described above have the disadvantage that, because of the small number of sensors provided, it is either impossible to have continuous monitoring of the surroundings or it is necessary to provide mechanical tilting instruments for monitoring the entire surrounding region.

In order to avoid this disadvantage, U.S. Pat. No. 5,572,484 describes an ultrasonic warning system for vehicles which contains a rear transmission and reception arrangement consisting of four discretely arranged transmission and reception units integrated in a hexagonal fender arrangement, and a front transmission and reception arrangement consisting of six more transmission and reception units, likewise discretely arranged and integrated in a front fender. Four of the units in the front of the vehicle are arranged to monitor forwardly of the vehicle and the other two are arranged to monitor the front right and front left corner regions. However, such a large number of sensors involves extensive mounting arrangements and great expense.

SUMMARY OF THE INVENTION

Accordingly, it is an object of the present invention to provide an arrangement for determining the distance of objects which overcomes the disadvantages of the prior art.

Another object of the invention is to provide an arrangement for determining the distance of objects which fully monitors the surrounding region and can be mounted simply and at low cost.

These and other objects of the invention are attained by providing an arrangement for determining distance having a number of electrostatic ultrasonic transducers formed by superposed layers which allows the use of a broad frequency spectrum. The ultrasonic transducers have fixed electrodes with conductive tracks—connected to them in a structured first metal layer which can, for example, be produced by an etching or screenprinting method. This is followed by an insulation layer and a full-surface second metal layer on one surface of the insulation layer providing counterelectrodes for the electrodes of the ultrasonic transducers formed by the first metal layer.

In one embodiment the insulation layer is an insulation sheet which is positioned on the structured first metal layer. The insulation layer may have holes in the region of the electrodes for the ultrasonic transducers formed by the first metal layer in order to form air cushions.

Another embodiment of the invention has an insulation sheet which is fully metallized on its side remote from the electrodes to provide the second metal layer.

A further embodiment has the second metal layer on a further plastic sheet which can be used as a protective layer for the ultrasonic transducers to protect them against dirt and mechanical damage. The superposed layer assembly is preferably-flexible and has a maximum thickness of about 0.10 mm, thereby facilitating design freedom.

When a distance-determining arrangement according to the invention is used in a motor vehicle, the layer assembly which forms the plurality of ultrasonic transducers is preferably applied to the fenders or the trim strips of the motor vehicle.

Using a sandwich array made in this way, a large number of ultrasonic transducers can be produced simultaneously in simple fashion and can, for example, be applied inexpensively on an outer part of the motor vehicle. The formation of conductive tracks in the first metal layer at the same time considerably reduces the wiring cost for the ultrasonic transducers.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
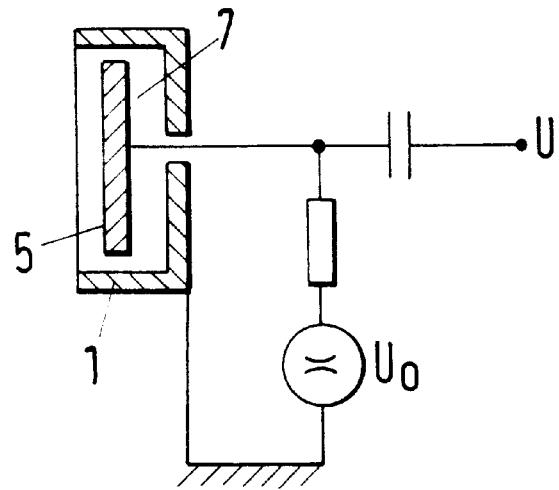
FIG. 1 is a schematic diagram illustrating the electrical arrangement of a representative embodiment of an electrostatic ultrasonic transducer.

In the typical electrostatic ultrasonic transducer schematically shown in FIG. 1, the transducer is constructed in the manner of a plate capacitor. A thin conductive diaphragm which constitutes a counterelectrode is positioned opposite a solid electrode 1. By applying a voltage U, an electrostatic force is produced between the diaphragm 5 and the electrode 1, so that the electrodes 1 and 5 are simultaneously attracted to each other. Since the electrode 1 is rigid, an AC voltage U will cause the flexible diaphragm 5 to be excited into oscillation so that it emits sonic waves into the surrounding air. Since the electrostatic force on the diaphragm 5 increases proportionally to the square of the applied voltage U, the working point on the quadratic characteristic curve may be shifted by superposing a high DC voltage $U_0$ on the applied AC voltage U. As a result of superposition of the DC voltage $U_0$, which is high compared to the AC voltage, linear operation of the ultrasonic transducer is achieved. Consequently, the force produced, and the resulting sonic pressure, are proportional to the applied AC voltage U. In addition, because of the higher total voltage, the sonic pressure is higher than when the AC voltage is applied alone.

The motion of the diaphragm 5 is influenced not only by its mass and its flexibility, but also by the air cushion in the narrow gap 7 between the diaphragm and the electrode 1. When the thickness of the air cushion in that gap is reduced by deflection of the diaphragm 5, an overpressure is generated and the air flows out of the gap 7. Conversely, when a pressure reduction occurs in the gap 7 upon an increase in the distance between the electrodes 1 and 5, air is drawn into the gap.

Figure 2:
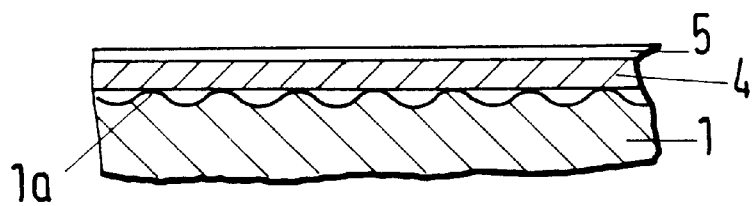
FIG. 2 is a fragmentary sectional schematic illustration showing a foil transducer.

If the diaphragm is in the form of a plastic sheet 4 which is metallized on one side and which rests directly on the solid electrode 1 as shown in FIG. 2, then a so-called foil transducer is produced. Because the surface of the electrode 1 is never completely smooth, the diaphragm 4 rests on minute elevations 1a so that a thin and yielding air cushion in which the diaphragm 4 can oscillate, always remains. The surface condition of the electrode 1 has a decisive influence on the fundamental frequency and the sensitivity of the ultrasonic transducer. In the case of a smooth, highly polished electrode 1, the frequency range extends up to about 500 kHz with a relatively low sensitivity. Roughened or grooved electrodes 1 have lower fundamental frequencies and higher sensitivities. A fine mesh wire fabric can even be used as the electrode 1. Thus, the shape of the ultrasonic transducer can have an almost arbitrary design.

Figure 5:
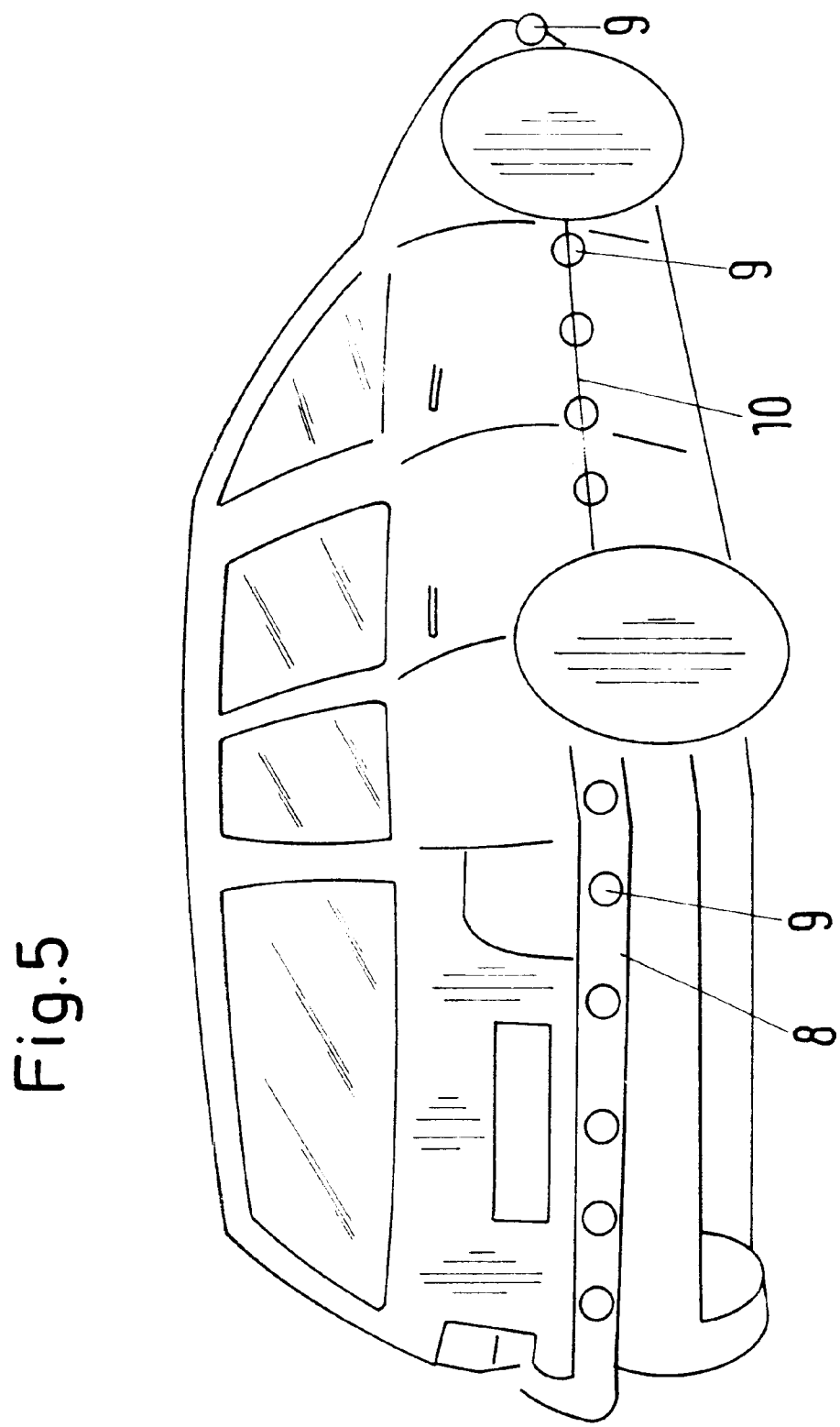
FIG. 5 is a perspective view showing a representative arrangement of ultrasonic transducers on a motor vehicle.

A relatively large number of ultrasonic transducers is required for determining objects and their distance, for example in the rearward or lateral regions of a motor vehicle. The application of discrete conventional ultrasonic transducers requires elaborate fitting and wiring and is often barely satisfactory from the design point of view. As shown in FIG. 5, linear arrays of ultrasonic transducers of the type shown in FIGS. 1–3 may be conveniently mounted on the fenders 8 and the trim strips 10 of a motor vehicle.

Figure 3:
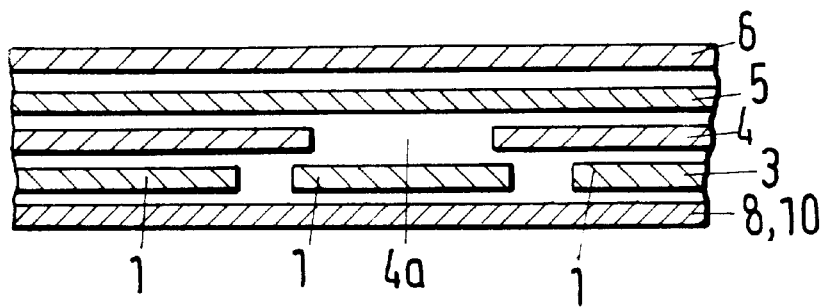
FIG. 3 is a fragmentary sectional view showing a layer structure for an arbitrary number of ultrasonic transducers.
Figure 4:
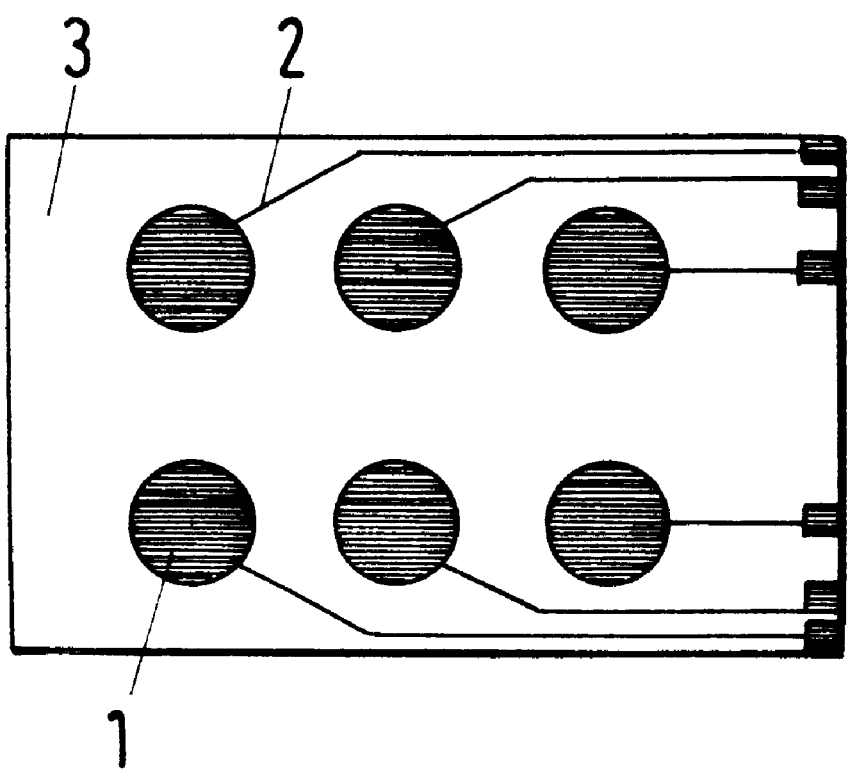
FIG. 4 is a plan view showing the structure of the first metal layer.

FIG. 3 shows one possible transducer arrangement, consisting of superposed layers 3, 4 and 5, by which a large number of thin ultrasonic transducers may be made which can conveniently be applied to the parts 8 and 10 of a motor vehicle, for example by adhesive bonding. The lowest first metal layer 3 is arranged so as to form the ultrasonic transducer electrodes 1 and the conductive tracks 2 which are connected to them. One possible arrangement of electrodes 1 and tracks 2 in this first metal layer 3 is shown in FIG. 4. The first metal layer 3 may in this case be formed on or applied to a plastic sheet which is bonded adhesively onto the vehicle part 8 or 10.

Over the first metal layer 3 there is an insulating layer 4, which electrically isolates the first metal layer 3 from the second, full-surface metal layer 5 as shown in FIG. 3. The insulation layer 4 may be formed by a separate insulating sheet which has holes 4a in the region of the electrodes 1 in order to provide air passages for the air cushions between the electrodes 1 and 5 of the ultrasonic transducers. If the insulating layer 4 is a separate plastic sheet, the second metal layer 5, which forms the counterelectrodes 5 for the electrodes 1 of the first metal layer 3, is applied to another sheet 6 which, for example, provides a protective layer for the ultrasonic transducers.

In another embodiment, the insulating sheet 4 is metallized on the side remote from the first metal layer 3 to provide the second metal layer 5. In this case, the insulating sheet 4 and the metal layer 5 together form the oscillating diaphragm. The required air cushions are then formed above the surface of the electrodes 1.

Although the invention has been described herein with reference to specific embodiments, many modifications and variations therein will readily occur to those skilled in the art. Accordingly, all such variations and modifications are included within the intended scope of the invention.

We claim:

1. An arrangement for determining the distance of objects comprising:
   a plurality of electrostatic ultrasonic transducers each containing a plurality of superposed layers including a first metal layer providing a number of electrodes corresponding to the number of ultrasonic transducers and conductive tracks connected to the electrodes, an insulating layer on the first metal layer, the insulating layer being formed with openings providing air cushions adjacent to the electrodes, and a full-surface second metal layer on the insulating layer providing oscillating counterelectrodes for the electrodes provided by the first metal layer.

2. An arrangement according to claim 1 wherein the first metal layer is supported on a sheet.

3. An arrangement according to claim 1 wherein the insulating layer is an insulating sheet.

4. An arrangement according to claim 3 wherein the second metal layer is affixed to the insulating layer.

5. An arrangement according to claim 1 wherein the second metal layer is affixed to a cover sheet for the plurality of ultrasonic transducers.

6. An arrangement according to claim 5 wherein the cover sheet forms a protective layer for the plurality of ultrasonic transducers.

7. An arrangement according to claim 1 wherein the plurality of superposed layers is flexible.

8. An arrangement according to claim 1 wherein the plurality of superposed layers has a total thickness of about 0.10 mm.

9. An arrangement according to claim 1 including a motor vehicle on which the plurality of ultrasonic transducers are mounted.

10. An arrangement according to claim 5 wherein the superposed layers of the transducers are affixed to an outer part of the motor vehicle.

11. An arrangement according to claim 10 wherein the superposed layers include a first metal layer which is applied directly on the outer part of the motor vehicle.

12. An arrangement according to claim 5 wherein the superposed layers are mounted on a fender of the motor vehicle.

13. An arrangement according to claim 9 wherein the superposed layers are affixed to a trim strip of the motor vehicle.

* * * * *